United States Patent
Matsui

(10) Patent No.: US 9,227,620 B2
(45) Date of Patent: Jan. 5, 2016

(54) ENGINE START CONTROL DEVICE AND ENGINE START CONTROL METHOD FOR HYBRID ELECTRIC VEHICLE

(71) Applicant: NISSAN MOTOR CO., LTD., Yokohama-shi, Kanagawa (JP)

(72) Inventor: Hiroki Matsui, Ebina (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/384,593

(22) PCT Filed: Mar. 15, 2013

(86) PCT No.: PCT/JP2013/057426
§ 371 (c)(1),
(2) Date: Sep. 11, 2014

(87) PCT Pub. No.: WO2013/137439
PCT Pub. Date: Sep. 19, 2013

(65) Prior Publication Data
US 2015/0149010 A1 May 28, 2015

(30) Foreign Application Priority Data

Mar. 15, 2012 (JP) ................................ 2012-059273

(51) Int. Cl.
*B60L 9/00* (2006.01)
*B60W 10/06* (2006.01)
(Continued)

(52) U.S. Cl.
CPC .................. *B60W 10/06* (2013.01); *B60K 6/48* (2013.01); *B60L 3/106* (2013.01); *B60L 11/14* (2013.01); *B60L 15/2072* (2013.01); *B60W 10/02* (2013.01); *B60W 10/08* (2013.01); *B60W 20/10* (2013.01); *B60W 20/40* (2013.01); *B60W 50/06* (2013.01); *F02N 11/08* (2013.01); *B60K 2006/4825* (2013.01); *B60L 2240/12* (2013.01); *B60L 2240/16* (2013.01); *B60L 2240/421* (2013.01); *B60L 2240/423* (2013.01); *B60L 2250/28* (2013.01); *B60W 2510/0241* (2013.01);
(Continued)

(58) Field of Classification Search
CPC ... B60W 10/04; B60W 10/023; B60W 10/06; B60W 10/08
See application file for complete search history.

(56) References Cited

U.S. PATENT DOCUMENTS

| | | | |
|---|---|---|---|
| 7,771,310 | B2 | 8/2010 | Tanishima |
| 2007/0227791 | A1 | 10/2007 | Ueno |
| 2007/0259755 | A1 | 11/2007 | Tanishima |

FOREIGN PATENT DOCUMENTS

| | | |
|---|---|---|
| JP | 2007-126082 A | 5/2007 |
| JP | 2007-261442 A | 10/2007 |

(Continued)

*Primary Examiner* — Michael D Lang
(74) *Attorney, Agent, or Firm* — Foley & Lardner LLP

(57) ABSTRACT

An engine start using an electric motor during a vehicle travel is performed by increasing an output torque of the electric motor in a slip state where a second frictional engagement element 3 connecting the electric motor 1 and a driving wheel slips. A controller determines a requested acceleration amount from a depression amount of an accelerator pedal. When the requested acceleration amount is significant, a different torque increment characteristic is applied, compared to a case where the requested acceleration amount is not significant. Thus, the internal combustion engine starts in a high response depending on the requested acceleration amount input by the driver, thereby improving a vehicle acceleration response.

6 Claims, 4 Drawing Sheets

(51) Int. Cl.
  B60K 6/48      (2007.10)
  B60L 11/14     (2006.01)
  B60W 10/02     (2006.01)
  B60W 10/08     (2006.01)
  B60L 3/10      (2006.01)
  B60L 15/20     (2006.01)
  B60W 50/06     (2006.01)
  B60W 20/00     (2006.01)
  F02N 11/08     (2006.01)
  F02N 5/04      (2006.01)
  F02N 15/02     (2006.01)
(52) U.S. Cl.
  CPC ...... *B60W 2510/06* (2013.01); *B60W 2510/084* (2013.01); *B60W 2540/103* (2013.01); *F02N 5/04* (2013.01); *F02N 15/022* (2013.01); *F02N 2200/02* (2013.01); *F02N 2200/10* (2013.01); *F02N 2200/105* (2013.01); *Y02T 10/6221* (2013.01); *Y02T 10/6252* (2013.01); *Y02T 10/6286* (2013.01); *Y02T 10/642* (2013.01); *Y02T 10/70* (2013.01); *Y02T 10/7077* (2013.01); *Y02T 10/7275* (2013.01); *Y10S 903/902* (2013.01)

(56) References Cited

FOREIGN PATENT DOCUMENTS

| | | |
|---|---|---|
| JP | 2007-297014 A | 11/2007 |
| JP | 2010-201962 A | 9/2010 |

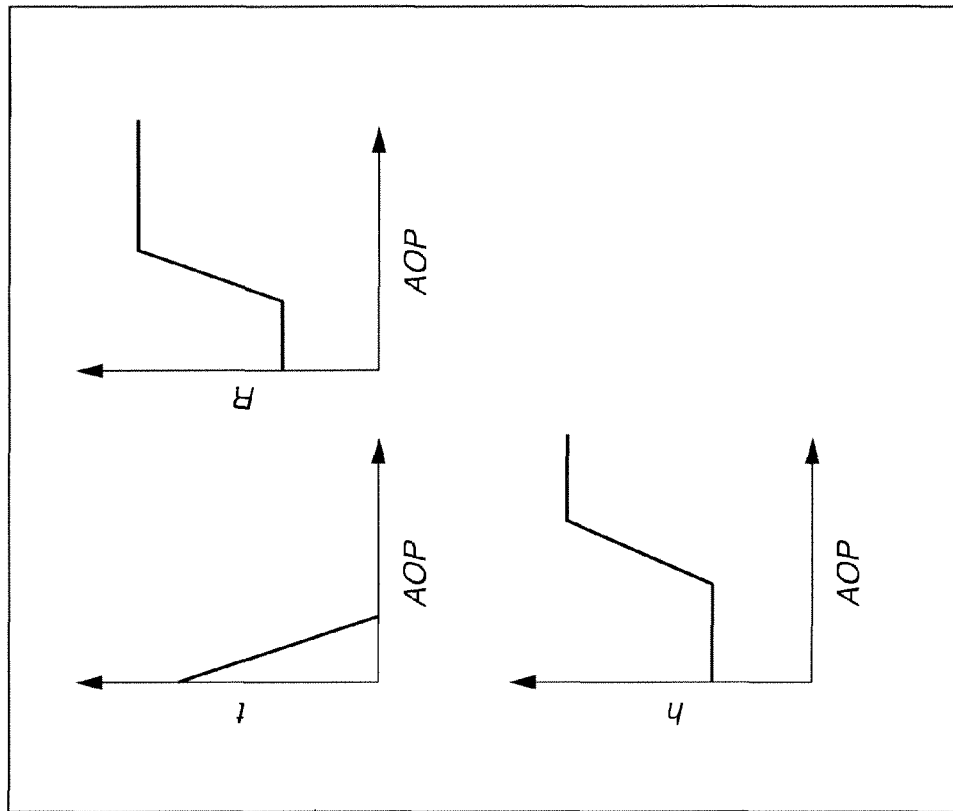
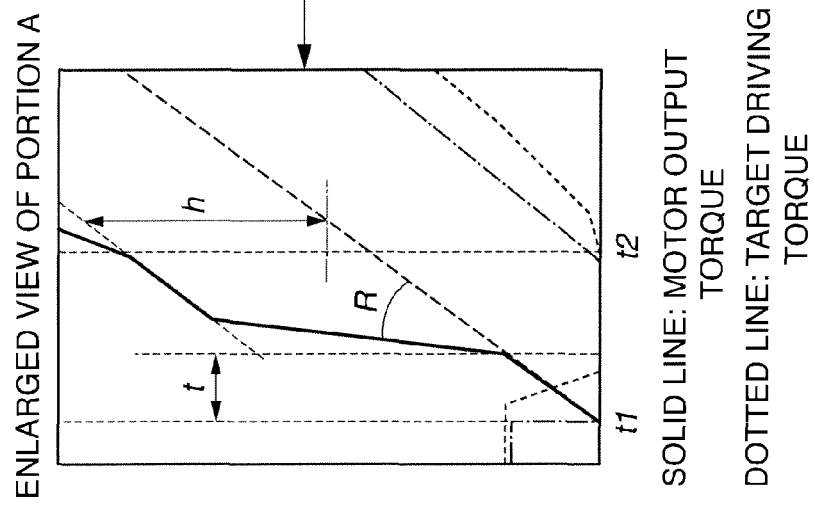
FIG. 4A
FIG. 4B

ENGINE START CONTROL DEVICE AND ENGINE START CONTROL METHOD FOR HYBRID ELECTRIC VEHICLE

TECHNICAL FIELD

This invention relates to a control of an electric motor for starting an engine of a hybrid electric vehicle.

BACKGROUND ART

In a hybrid electric vehicle comprising an internal combustion engine and an electric motor, an electric vehicle (EV) mode in which only the electric motor is used as motive power and a hybrid electric vehicle (HEV) mode in which both the internal combustion engine and the electric motor are used as motive power are selectively applied.

In order to switch from the EV mode to the HEV mode, cranking of the internal combustion engine is performed using an output torque of the electric motor to start the internal combustion engine. The electric motor and the internal combustion engine are connected via a first frictional engagement element.

JP 2007-126082 A published by Japan Patent Office, proposes a method of starting the internal combustion engine during a vehicle traveling at a low vehicle speed by increasing a rotation speed of the electric motor while a second frictional engagement element interposed between the electric motor and the drive wheel slips. The internal combustion engine and the electric motor are connected to each other via a first frictional engagement element. Herein, each of the frictional engagement elements is constituted by a clutch.

SUMMARY OF INVENTION

The prior art enables the start of the internal combustion engine for switching from the EV mode to the HEV mode even at a low vehicle speed.

The start of the internal combustion engine during a vehicle traveling may be necessary when acceleration of the vehicle is requested by depressing an accelerator pedal. Further, the start of the internal combustion engine may be requested to charge a battery having a low charge amount using a torque of the internal combustion engine.

In the former case, in order to perform acceleration with a fast response, it is desirable to start the internal combustion engine early in a state where the second frictional engagement element between the electric motor and the drive wheel slips. Meanwhile, in the latter case, since the rotation speed of the electric motor increases, it is desirable to prevent a shock that may be caused by an abrupt increase in the motor torque unintended by a driver.

According to the prior art, however, it is difficult to satisfy such tradeoff requirements.

It is therefore an object of this invention to improve an acceleration response of a vehicle when the requested acceleration amount is significant while preventing a shock that may occur by starting an engine when the requested acceleration amount is insignificant.

In order to achieve the above object, this invention provides an engine start control device for a hybrid electric vehicle. The vehicle comprises a drive wheel, an electric motor, an internal combustion engine, a first frictional engagement element connecting the electric motor and the internal combustion engine, a second frictional engagement element connecting the electric motor and the drive wheel, and an accelerator pedal that inputs a requested acceleration amount to the vehicle.

The engine start control device comprises an accelerator opening sensor that detects the requested acceleration amount and a programmable controller.

The controller is programmed to determine to start the internal combustion engine using a torque of the electric motor when the vehicle is running in an electric vehicle mode in which the vehicle travels by a power of the electric motor while the internal combustion engine is inoperative, control the second frictional engagement element to a slip state in which a torque is transmitted through a slipping operation of the second frictional engagement element, and input a rotation torque of the electric motor to the internal combustion engine via the first frictional engagement element. The controller is further programmed to determine whether or not the requested acceleration amount exceeds a predetermined amount, and increase the rotation torque of the electric motor input to the internal combustion engine when the requested acceleration amount exceeds the predetermined amount, compared to a case where the requested acceleration request amount does not exceed the predetermined amount.

The details as well as other features and advantages of this invention are set forth in the remainder of the specification and are shown in the accompanying drawings.

BRIEF DESCRIPTION OF DRAWINGS

FIGS. 4A and 4B are a diagram illustrating a characteristic of a map stored by the controller and an enlarged view illustrating a portion A of FIG. 3, respectively.

DESCRIPTION OF EMBODIMENTS

Figure 1:
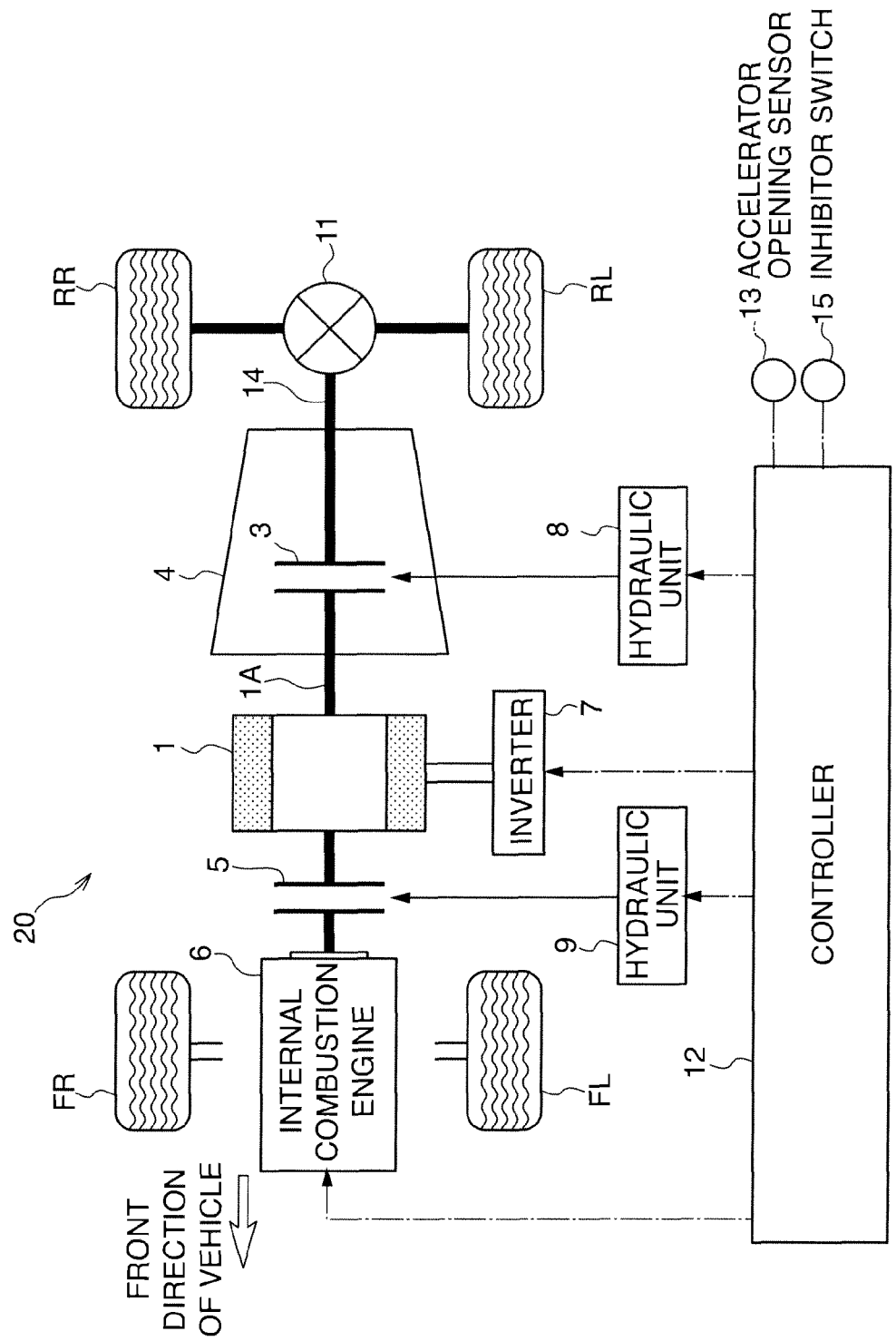
FIG. 1 is a schematic block diagram illustrating a hybrid electric vehicle according to this invention.

Referring to FIG. 1 of the drawings, an engine start control device according to an embodiment of this invention is applied to a rear wheel drive hybrid electric vehicle 20. The hybrid electric vehicle 20 travels using four wheels including a front right wheel FR, a front left wheel FL, a rear right wheel RR, and a rear left wheel RL. In this configuration, the rear right wheel RR and the rear left wheel RL serve as a drive wheel.

The rear right wheel RR and the rear left RL serving as a drive wheel are combined into a propeller shaft 14 via a differential gear 11. The propeller shaft 14 is connected to an electric motor/generator 1 via an automatic transmission 4. The electric motor/generator 1 is connected to an internal combustion engine 6 via a first frictional engagement element 5 constituted by a clutch.

The first frictional engagement element 5 is operated between an engagement position and a disengagement position depending on a hydraulic pressure supplied from a hydraulic unit 9. In the engagement position, a torque transmits bidirectionally between the electric motor/generator 1 and the internal combustion engine 6 so that they rotate in a synchronous manner. In the disengagement position, the electric motor/generator 1 and the internal combustion engine 6 relatively rotate in an independent manner.

The automatic transmission 4 is a planetary gear stepped automatic transmission and is internally provided with a second frictional engagement element 3. The second frictional engagement element 3 is constituted by a low brake of the automatic transmission 4. The second frictional engagement element 3 is operated by a hydraulic pressure supplied from a hydraulic unit 8. In the engaged state, the second frictional engagement element 3 combines an output shaft 1A of the electric motor 1 and the propeller shaft 14 so that they rotate in a synchronous manner. In the disengaged state, the output shaft 1A and the propeller shaft 14 relatively rotate without a resistance.

It is noted that both the first and second frictional engagement elements 5 and 3 have a slip mode. In the slip mode, the first frictional engagement element 5 allows the internal combustion engine 6 and the electric motor/generator 1 to relatively rotate under a frictional resistance depending on the hydraulic pressure supplied from the hydraulic unit 9. Similarly, in the slip mode, the second frictional engagement element 3 allows the output shaft 1A and the propeller shaft 14 to relatively rotate under a frictional resistance depending on the hydraulic pressure supplied from the hydraulic unit 8.

An inverter 7 is connected to the electric motor/generator 1. The electric motor/generator 1 rotates by virtue of electric power supplied from a battery, not illustrated, through the inverter 7. In addition, in the engaged state, electricity is generated using the torque of the internal combustion engine 6 input through the first frictional engagement element 5 and is charged in the battery.

A driving operation and an electric generation operation of the electric motor/generator 1 are controlled in response to an input signal from the controller 12 to the inverter 7. A switching between three modes, i.e., the engagement mode, the slip mode, and the disengagement mode of the second frictional engagement element 3, is performed in response to an input signal from the controller 12 to the hydraulic unit 8. A switching between three modes, i.e., the engagement mode, the slip mode, and the disengagement mode of the first frictional engagement element 5, is performed in response to an input signal from the controller 12 to the hydraulic unit 9. A driving operation of the internal combustion engine 6 is also controlled in response to an input signal from the controller 12.

The controller 12 also performs a gearshift control of the automatic transmission 4. However, since this invention is not directed to the gearshift control, a description thereof will not be provided.

The controller 12 that performs the control described above is constituted by a microcomputer comprising a central processing unit (CPU), a read-only memory (ROM), a random access memory (RAM), and an input/output (I/O) interface. In this embodiment, for convenient description purposes, it is assumed that a single controller 12 controls overall operations of the hydraulic units 8 and 9, the internal combustion engine 6, and the electric motor/generator 1. Alternatively, a separate controller may also be employed to perform the control depending on a control target.

The controller 12 receives detection data through a corresponding signal circuit from an accelerator opening sensor 13 that detects an accelerator opening amount corresponding to a depression amount of an accelerator pedal of the hybrid electric vehicle 20 and an inhibitor switch 15 that detects an operation position of a selector lever with which the vehicle is provided.

In the configuration described above, the hybrid electric vehicle 20 performs an EV mode in which only the power from the electric motor/generator 1 is used as a motive force and an HEV mode in which both the power from the electric motor/generator 1 and the power from the internal combustion engine 6 are used as the motive force.

When the operation switches from the EV mode to the HEV mode, both the first and second frictional engagement elements 5 and 3 are set to the slip mode to increase an output torque of the electric motor/generator 1, thereby cranking the internal combustion engine 6. In this state, a fuel is supplied to the internal combustion engine 6 such that the internal combustion engine 6 starts to operate.

The start of the internal combustion engine 6 during the EV mode may be performed when a driver steps on the accelerator pedal, that is, based on a requested acceleration amount of the vehicle 20 or when a charge amount of the battery decreases as much as a battery charge is required, that is, based on a system request. In the latter case, the electric motor/generator 1 is driven as a generator to charge the battery while a vehicle travels by virtue of a driving force from the internal combustion engine 6. This is performed regardless of the requested acceleration amount.

When the requested acceleration amount is significant, it is desirable to start the internal combustion engine 6 within a short time by rapidly increasing the output torque of the electric motor/generator 1 and increase the input torque of the automatic transmission 4 with excellent responsiveness. Meanwhile, if the internal combustion engine 6 starts while the requested acceleration amount is zero or insignificant, it is desirable to increase the output torque of the electric motor/generator 1 smoothly in order to suppress a shock from occurring due to an abrupt increase in the output torque of the electric motor/generator 1. In order to satisfy such tradeoff requirements, the controller 12 executes an engine start control routine illustrated in FIG. 2.

Figure 2:
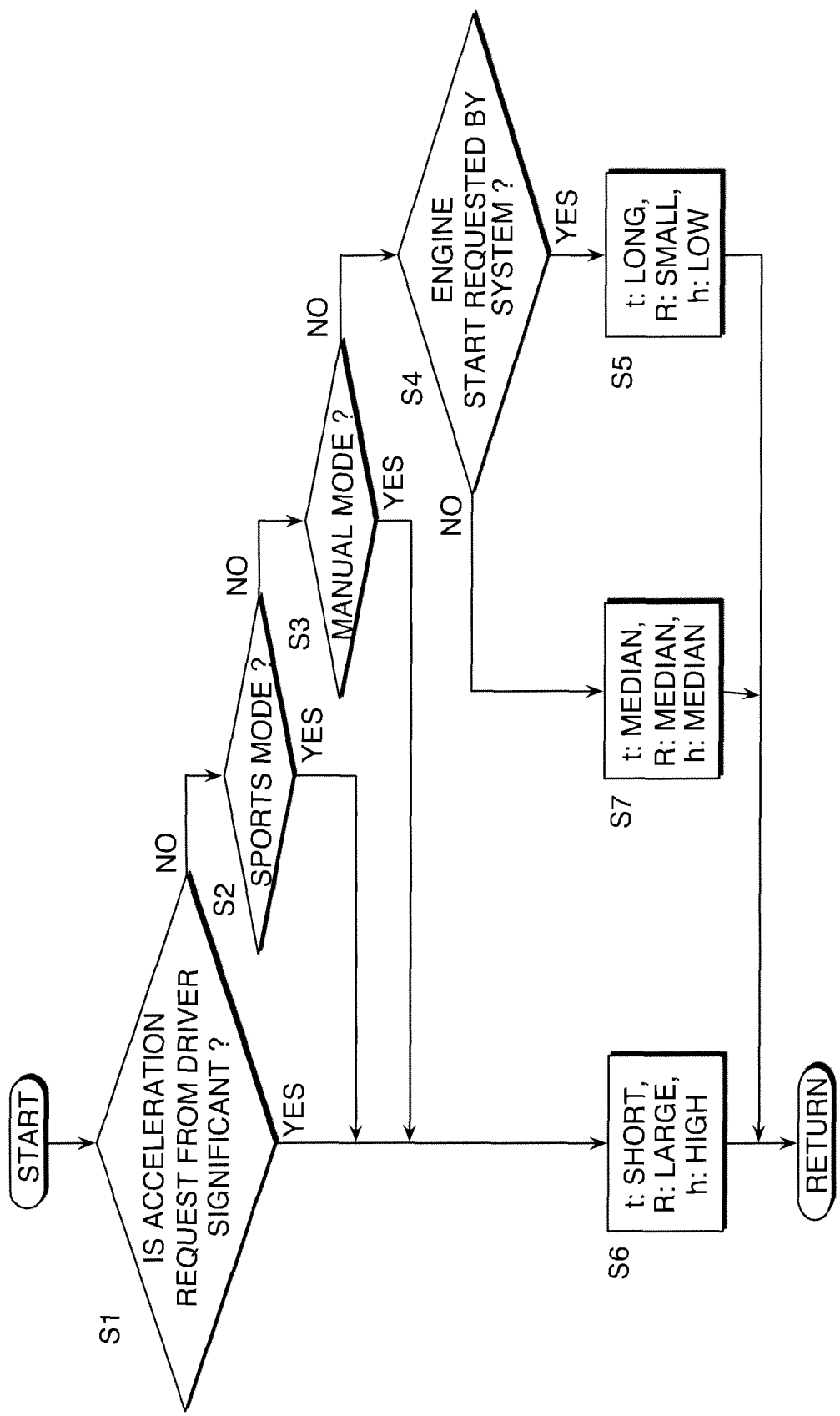
FIG. 2 is a flowchart illustrating an engine start control routine executed by a controller according to this invention.

Referring to FIG. 2, this routine is executed when there is an engine start request.

In a step S1, the controller 12 determines whether or not the requested acceleration amount by the driver is significant. Specifically, when an accelerator opening amount APO detected by the accelerator opening sensor 13 is greater than a predetermined opening amount, or when an increase rate of the accelerator opening amount APO is greater than a predetermined rate, it is determined that the requested acceleration amount by the driver is significant.

If the determination in the step S1 is affirmative, parameters t, R, and h for setting a target output torque of the electric motor/generator 1 are determined and the target output torque is set based on the parameters t, R, and h in a step S6.

Next, a description will be made for the parameters t, R, and h with reference to FIGS. 3D and 4B.

Figure 3A:
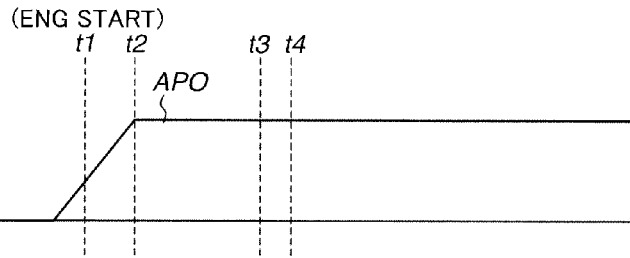
FIGS. 3A to 3E are timing charts illustrating a result of executing the engine start control routine.
Figure 3B:
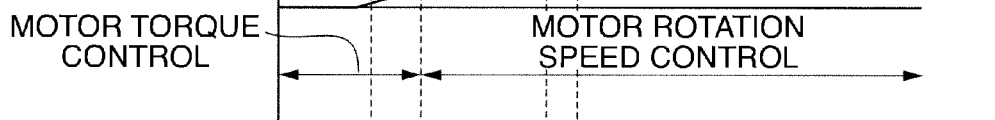
Figure 3C:
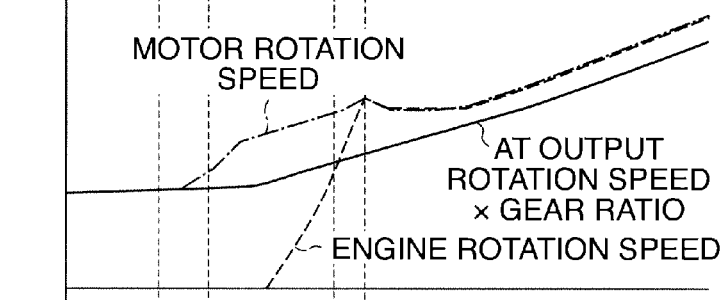
Figure 3D:
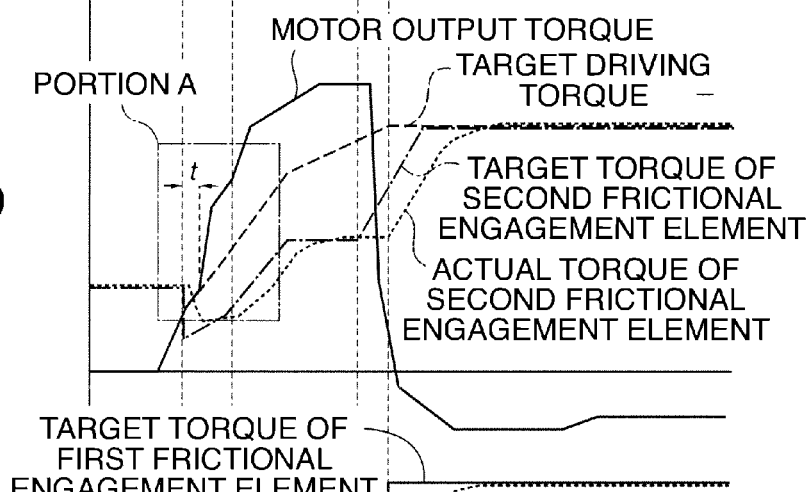

Referring to FIG. 3D, a dotted line of the figure denotes a typical target output torque of the electric motor/generator 1 based on the pedal depression of the accelerator pedal. As indicated by this dotted line, the target output torque of the electric motor/generator 1 increases depending on the pedal depression of the accelerator pedal even when the start of the internal combustion engine 6 is not performed. When the engine start control routine of FIG. 2 is executed, the start of the internal combustion engine 6 using the rotation torque of the electric motor/generator 1 is performed regardless of the determination result of the step S1. For this reason, as indicated by a portion A of FIG. 3D, the target output torque of the electric motor/generator 1 is further increased for the start of the internal combustion engine 6, compared to a broken line of the drawing. The parameters t, R, and h are values for determining a characteristic of the increment.

Referring to FIG. 4B, the parameter t represents a time elapsed from the cranking start t1 of the internal combustion engine 6 to the start of the increase of the target output torque. The parameter h represents an absolute amount of the increment. The parameter R represents the increment reaching rate. In other words, the target output torque increases as the parameter t decreases, the parameter h increases, and the parameter R increases.

The controller 12 determines the parameters t, R, and h from the accelerator opening amount APO by referencing to a map stored in advance in the ROM and having a characteristic illustrated in FIG. 4A. As recognized from FIG. 4A, as the accelerator opening amount APO increases, the parameter t decreases, the parameter h increases, and the parameter R increases. Based on the parameters, t, R, and h set in this manner, the controller 12 computes the target output torque of the electric motor/generator 1 and controls the output torque of the electric motor/generator 1 to the target output torque via the inverter 7. As a result, compared to the control of the output torque of the electric motor/generator 1 performed in steps S5 and S7 described below, it is possible to start the internal combustion engine 6 with excellent responsiveness and obtain a fast acceleration response.

Meanwhile, if the determination is negative in the step S1, the controller 12 determines whether or not the automatic transmission 4 is set to a sports mode based on the input signal from the inhibitor switch 15 in a step S2. The sports mode is an operation mode selected by the driver in advance by manipulating the selector lever. If the automatic transmission 4 is set to the sports mode, the controller 12 processes the step S6.

If the automatic transmission 4 is not set to the sports mode, the controller 12 determines whether or not the automatic transmission 4 is set to a manual mode based on the input signal from the inhibitor switch 15 in a step S3. The manual mode is an operation mode in which the driver changes a gear ratio manually. The manual mode is selected in advance by manipulating the selector lever. It is noted that, in the case of the hybrid electric vehicle 20, an eco mode applied to a normal operation is set as the operation mode in addition to the sports mode or the manual mode. If the automatic transmission 4 is set to the manual mode, the controller 12 processes the step S6.

In the sports mode or the manual mode, the step S6 is processed as in the case where an acceleration request is significant because a fast response to pedaling is more important than shock prevention in these modes.

If the automatic transmission 4 is not set to the manual mode in the step S3, the controller 12 determines whether or not the start request for the internal combustion engine 6 is caused by a start request issued from a hybrid driving system in a step S4. Here, all the start requests for the internal combustion engine 6 are considered as the system request except for the acceleration request from the driver. The start of the internal combustion engine 6 caused by the system request includes a start of the internal combustion engine 6 necessary to maintain the hybrid driving system such as a start for a battery charge operation.

If the determination is affirmative in the step S4, the controller 12 determines the parameters t, R, and h based on the accelerator opening amount APO and sets the target output torque based on the parameters t, R, and h in the step S5 similar to the step S6. However, a map of the parameters t, R, and h used in the step S5 is set such that the parameter t is longer, the parameter h is lower, and the parameter R is smaller for the same accelerator opening amount APO, compared to the map used in the step S6. This map is also stored in the ROM in advance.

As a result, in the target output torque of the electric motor/generator 1 computed from the parameters t, R, and h in the step S5, a rising edge of the increment is delayed, the absolute amount of the increment decreases, and the target output torque reaches the absolute amount of the increment lately, compared to the target output torque determined in the step S6. As a result, the target output torque of the electric motor/generator 1 moderately rises just by a little amount. Therefore, a shock caused by an abrupt increase of the output torque of the electric motor/generator 1 is not generated, and the driver or a passenger does not feel uncomfortable.

Meanwhile, if the determination is negative in the step S4, the controller 12 determines the parameters t, R, and h based on the accelerator opening amount APO and sets the target output torque based on the parameters t, R, and h in the step S7 similar to the step S6. However, a map of the parameters t, R, and h used in the step S7 is set such that the parameters t, h, and R have median values. The median value refers to each middle value between the parameters t, R, and h of the map used in the step S5 and the parameters t, R, and h of the map used in the step S6. This map is also stored in the ROM in advance. The controller 12 uses different maps in the steps S5, S6, and S7 in this manner.

Each of the increment initiation time t of the target output torque, the increment h, and the increment reaching rate R set in the step S7 is set to the median value between the value set in the step S5 and the value set in the step S6. The step S7 is executed based on an acceleration request from the driver but the requested acceleration amount is not significant. In this case, by employing the median values for the parameters, it is possible to appropriately suppress a shock caused by the start of the internal combustion engine 6 while obtaining an appropriate acceleration response. The controller 12 terminates the routine after any one of the steps S5, S6, and S7 is processed.

Referring to FIGS. 3A to 3E, a result of execution of the engine start control routine of FIG. 2 will be described. FIGS. 3A to 3E show a case where the processing of the step S6 is performed in the routine of FIG. 2.

Figure 3E:
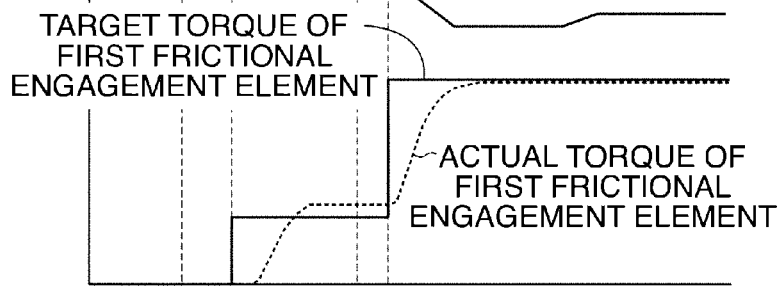

Referring to FIG. 3A, at a timing t1 after the accelerator opening amount increases from a coasting state, the controller 12 determines to start the internal combustion engine 6. At this timing, a transmission torque of the first frictional engagement element 5 is set to zero as illustrated in FIG. 3E. Meanwhile, the controller 12 maintains a hydraulic pressure supplied to the second frictional engagement element 3 using the hydraulic unit 8 at a low level to provide a small transmission torque of the second frictional engagement element 3.

As a result of the processing of step S6 of the routine of FIG. 2, the increment of the target output torque of the electric motor/generator 1 is initiated when time t elapses after timing t1 as illustrated in FIG. 3D. The increment is performed at a rate R. After the increment h reaches, the target torque increases in parallel with the dotted line of the drawing.

After a timing t2, the controller 12 increases the hydraulic pressure supplied from the hydraulic pressure supply unit 9 to the first frictional engagement element 5 as illustrated in FIG. 3E to operate the first frictional engagement element 5 in the slip mode. Similarly, the controller 12 increases the hydraulic pressure supplied to the second frictional engagement element 3 from the hydraulic unit 8 as illustrated in FIG. 3D to operate the second frictional engagement element 3 in the slip mode. In addition, the controller 12 switches the control target for the electric motor/generator 1 from the torque to the rotation speed after the timing t2 as illustrated in FIG. 3C. That is, the control based on the target torque of the electric motor/generator 1 is terminated, and the control based on a target rotation speed of the electric motor/generator 1 is executed. Therefore, a change of the output torque during a period from the timing t2 to a timing t3 is a result of the control for the rotation speed.

At the timing t3, the controller further increases the hydraulic pressure supplied from the hydraulic pressure supply unit 8 to set the second frictional engagement element 3 in the engaged state. At a timing t4, the rotation speed of the internal combustion engine 6 is synchronized with the rotation speed of the electric motor/generator 1. The controller 12 further increases the hydraulic pressure of the hydraulic pressure supply unit 9 to set the first frictional engagement element 5 in the engaged state. Then, while both the first and second frictional engagement elements 5 and 3 are in the engaged state, the hybrid electric vehicle 20 is driven using both the power of the internal combustion engine 6 and the power of the electric motor/generator 1.

As described above, in the engine start operation performed when the requested acceleration amount from the driver is significant, the engine start control device reduces the delay time t of the timing for initiating the increment of the target output torque of the electric motor/generator 1 from the cranking start. That is, the increase in the target output torque of the electric motor/generator 1 is started earlier. For this reason, it is possible to start the internal combustion engine 6 with excellent responsiveness in response to pedaling of the accelerator pedal for the acceleration request and rapidly accelerate the hybrid electric vehicle 20 using the torque of the internal combustion engine 6.

Meanwhile, in the engine start operation performed when the requested acceleration amount is not significant, the engine start control device increases the delay time t of the timing for initiating the increment of the target output torque of the electric motor/generator 1 from the cranking start, compared to the case where the requested acceleration amount is significant. For this reason, it is possible to suppress a shock caused by a torque rise of the electric motor/generator 1 unintended by the driver.

In the engine start operation performed when the requested acceleration amount from the driver is significant, the engine start control device increases the increment h of the target output torque of the electric motor/generator 1. As the increment h increases, it is possible to further improve an acceleration response.

In the engine start operation performed when the requested acceleration amount from the driver is significant, the engine start control device increases the increment reaching rate R. As the reaching rate R increases, it is possible to further improve the acceleration response.

It is noted that, although all of the three parameters t, h, and R change in this embodiment, it may not be necessary to change all the parameters. By changing at least one of the three parameters t, h, and R, it is possible to prevent a shock when the acceleration request is not significant. In addition, it is possible to obtain effects corresponding to improvement of the acceleration response when the requested acceleration amount is significant.

In this embodiment, the requested acceleration amount is determined based on the accelerator opening amount APO, and the parameters t, h, and R are set based on the accelerator opening amount APO as illustrated in FIG. 4A. For this reason, it is possible to rapidly and reliably reflect an acceleration intention of the driver on the torque of the electric motor/generator 1.

In this embodiment, when the internal combustion engine 6 starts in the sports mode or the manual mode, the parameters t, h, and R are set based on a map similar to that used when the requested acceleration amount is significant. For this reason, a ratio between a response improvement factor and a shock prevention factor can be set differently between these modes and the eco mode. Therefore, it is possible to set various types of driving feelings.

As described above, according to this embodiment, the case where the requested acceleration amount from the driver is not significant is further classified in the step S4 into a case where the requested acceleration amount is further insignificant and a case where there is no acceleration request, and the torque control of the electric motor/generator 1 is differently processed between the steps S5 and S7. Alternatively, when the determination of the step S3 is negative, the processing of the step S5 may be performed immediately without determining if the acceleration request exists in the step S4.

The contents of Tokugan 2012-59273 with a filing date of Mar. 15, 2012 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

Although the invention has been described above with reference to a certain embodiment, the invention is not limited to the embodiment described above. Modifications and variations of the embodiment described above will occur to those skilled in the art, within the scope of the claims.

INDUSTRIAL FIELD OF APPLICATION

As described above, according to this invention, with respect to the start of the internal combustion engine of the hybrid electric vehicle, a shock caused by the engine start when the requested acceleration amount is insignificant is prevented. In addition, the acceleration response of the vehicle when the acceleration request is significant is improved. Accordingly, it is possible to anticipate advantages in improvement of a comfortable drive feeling of a hybrid electric vehicle.

The embodiments of this invention in which an exclusive property or privilege is claimed are defined as follows:

The invention claimed is:

1. An engine start control device for a hybrid electric vehicle, the hybrid electric vehicle comprising a drive wheel, an electric motor, an internal combustion engine, a first frictional engagement element connecting the electric motor and the internal combustion engine, a second frictional engagement element connecting the electric motor and the drive wheel, and an accelerator pedal that inputs a requested acceleration amount to the hybrid electric vehicle, the device comprising:

an accelerator opening sensor that detects the requested acceleration amount; and a programmable controller programmed to:

determine to start the internal combustion engine using an output torque of the electric motor, when the hybrid electric vehicle is running in an electric vehicle mode in which the hybrid electric vehicle travels by a power of the electric motor while the internal combustion engine is inoperative;

decrease a torque transmission amount of the second frictional engagement element to a torque transmission amount in a slip state in which the second frictional engagement element transmits a torque while slipping, increase the output torque of the electric motor by a predetermined increment in response to the requested acceleration amount, and engage the first frictional engagement element to input the output torque of the electric motor into the internal combustion engine, wherein the controller is further programmed to:
determine whether or not the requested acceleration amount exceeds a predetermined amount, and
when the requested acceleration amount exceeds the predetermined amount during a period from a start of decrease in the torque transmission amount of the second frictional engagement element until an engagement of the first frictional engagement element, advance a start timing of increasing the output torque of the electric motor by the predetermined increment, increase the predetermined increment, or increase a variation rate of the output torque of the electric motor until when the predetermined increment is materialized compared to a case where the requested acceleration amount does not exceed the predetermined amount.

2. The engine start control device according to claim 1, wherein the controller is further programmed to increase the predetermined increment of the output torque of the electric motor that is input into the internal combustion engine as the requested acceleration amount increases.

3. The engine start control device according to claim 1, wherein the accelerator opening sensor is configured to detect a depression speed of the accelerator pedal, and the controller is further programmed to increase the predetermined increment as a pedaling rate of the accelerator pedal increases.

4. The engine start control device according to claim 1, wherein the hybrid electric vehicle is provided with a sports mode as a traveling characteristic, and the controller is further programmed to increase the output torque of the electric motor that is input into the internal combustion engine when the internal combustion engine is started in the sports mode, as in a case where the requested acceleration amount exceeds the predetermined amount compared to a case where the requested acceleration amount does not exceed the predetermined amount.

5. The engine start control device according to claim 1, wherein the hybrid electric vehicle is provided with a manual mode as a traveling characteristic, and the controller is further programmed to increase the output torque of the electric motor that is input into the internal combustion engine when the internal combustion engine is started in the manual mode, as in a case where the requested acceleration amount exceeds the predetermined amount compared to a case where the requested acceleration amount does not exceed the predetermined amount.

6. An engine start control method for a hybrid electric vehicle, the hybrid electric vehicle comprising a drive wheel, an electric motor, an internal combustion engine, a first frictional engagement element connecting the electric motor and the internal combustion engine, a second frictional engagement element connecting the electric motor and the drive wheel, and an accelerator pedal that inputs a requested acceleration amount to the hybrid electric vehicle, the method comprising:

detecting the requested acceleration amount to the hybrid electric vehicle;
determining to start the internal combustion engine using an output torque of the electric motor, when the hybrid electric vehicle is running in an electric vehicle mode in which the hybrid electric vehicle travels by a power of the electric motor while the internal combustion engine is inoperative;
decreasing a torque transmission amount of the second frictional engagement element to a torque transmission amount in a slip state in which the second frictional engagement element transmits a torque while slipping,
increase the output torque of the electric motor by a predetermined increment in response to the requested acceleration amount, and
engaging the first frictional engagement element to input the output torque of the electric motor into the internal combustion engine,
wherein the method further comprises:
determining whether or not the requested acceleration amount exceeds a predetermined amount, and
when the requested acceleration amount exceeds the predetermined amount during a period from a start of decrease in the torque transmission amount of the second frictional engagement element until an engagement of the first frictional engagement element, advancing a start timing of increasing the output torque of the electric motor by the predetermined increment, increasing the predetermined increment, or increasing a variation rate of the output torque of the electric motor until when the predetermined increment is materialized compared to a case where the requested acceleration amount does not exceed the predetermined amount.

* * * * *